(12) United States Patent
Gingher et al.

(10) Patent No.: US 9,272,204 B2
(45) Date of Patent: Mar. 1, 2016

(54) EDUCATION THROUGH EMPLOYMENT OF GAMING

(71) Applicants: Kurt Gingher, San Francisco, CA (US); Neil Seitz, St. Louis, MO (US); Roderic R. Jahner, Wake Forest, NC (US); Michelle Marie Katics, San Francisco, CA (US)

(72) Inventors: Kurt Gingher, San Francisco, CA (US); Neil Seitz, St. Louis, MO (US); Roderic R. Jahner, Wake Forest, NC (US); Michelle Marie Katics, San Francisco, CA (US)

(73) Assignee: BankersLab, Inc., Wilmington, DE (US)

( * ) Notice: Subject to any disclaimer, the term of this patent is extended or adjusted under 35 U.S.C. 154(b) by 14 days.

(21) Appl. No.: 13/888,586

(22) Filed: May 7, 2013

(65) Prior Publication Data

US 2013/0310121 A1    Nov. 21, 2013

Related U.S. Application Data

(60) Provisional application No. 61/643,392, filed on May 7, 2012.

(51) Int. Cl.
| | | |
|---|---|---|
| *A63F 13/00* | (2014.01) | |
| *G09B 19/18* | (2006.01) | |
| *G09B 19/22* | (2006.01) | |

(52) U.S. Cl.
CPC ............... *A63F 13/00* (2013.01); *G09B 19/18* (2013.01); *G09B 19/22* (2013.01)

(58) Field of Classification Search
CPC ....................................................... A63F 13/00
USPC ................................................. 463/1; 705/39
See application file for complete search history.

(56) References Cited

U.S. PATENT DOCUMENTS

| | | | | |
|---|---|---|---|---|
| 6,112,190 | A * | 8/2000 | Fletcher et al. | 705/36 R |
| 6,709,330 | B1 * | 3/2004 | Klein et al. | 463/9 |
| 6,773,350 | B2 * | 8/2004 | Yoshimi et al. | 463/42 |
| 7,469,227 | B2 * | 12/2008 | Breeden et al. | 705/36 R |
| 7,846,014 | B2 | 12/2010 | Shelton | |
| 8,831,972 | B2 | 9/2014 | Angell | |
| 8,930,067 | B1 | 1/2015 | Green | |

(Continued)

OTHER PUBLICATIONS

Sapere Aude Learning & Development, http://www.sapere-aude.info/, May 6, 2013, p. 1, Matthias Abold, Willy-Schreier-Str. 21. Idstein 65510, DE.

(Continued)

*Primary Examiner* — David L Lewis
*Assistant Examiner* — Shauna-Kay Hall
(74) *Attorney, Agent, or Firm* — Robert J. Brill; Brill IP Law Office

(57) ABSTRACT

A calculation engine of an apparatus in an example is employable for interactive simulation gaming to create an active learning environment on credit risk management for a learner. The calculation engine simulates one or more retail lending portfolios in a retail bank over a selectable period of time in the active learning environment for the learner. The calculation engine allows and/or requests the learner to decide, select, and/or choose one or more parameters for a strategy for credit policy and/or loan approval. The calculation engine employs the one or more parameters from the learner to calculate a financial outcome of the one or more retail lending portfolios in the retail bank over the selectable period of time that reflects the strategy for credit policy and/or loan approval by the learner in a corresponding run of the active learning environment on credit risk management for the learner.

20 Claims, 11 Drawing Sheets

Game Structure

(56) References Cited

U.S. PATENT DOCUMENTS

| | | | |
|---|---|---|---|
| 8,930,225 B2 | 1/2015 | Morris | |
| 8,930,235 B2 | 1/2015 | Mihic | |
| 8,930,254 B2 | 1/2015 | von Groll | |
| 8,932,139 B2 | 1/2015 | Brosnan | |
| 8,934,995 B2 | 1/2015 | Eisner | |
| 8,935,172 B1 | 1/2015 | Noble, Jr. | |
| 8,939,834 B2 | 1/2015 | Bond | |
| 8,939,841 B2 | 1/2015 | Englman | |
| 8,942,920 B1 | 1/2015 | Davidson | |
| 8,944,928 B2 | 2/2015 | Kaps | |
| 8,951,117 B2 | 2/2015 | Joko | |
| 8,956,230 B2 | 2/2015 | Adhikari | |
| 8,958,741 B2 | 2/2015 | Berger | |
| 8,961,305 B2 | 2/2015 | Takeda | |
| 8,961,317 B2 | 2/2015 | Kelly | |
| 8,965,786 B1 | 2/2015 | Frumkin | |
| 8,966,065 B2 | 2/2015 | Barrett | |
| 8,968,004 B2 | 3/2015 | Rath | |
| 8,968,069 B2 | 3/2015 | Kato | |
| 8,972,658 B2 | 3/2015 | Yoshino | |
| 8,972,874 B2 | 3/2015 | Grechanik | |
| 8,974,278 B2 | 3/2015 | Sama | |
| 8,979,632 B2 | 3/2015 | Kitamura | |
| 8,979,651 B1 | 3/2015 | Lan | |
| 8,986,108 B2 | 3/2015 | Zielinski | |
| 8,986,111 B2 | 3/2015 | Cuddy | |
| 8,986,114 B2 | 3/2015 | Emori | |
| 8,986,116 B1 | 3/2015 | Harrington | |
| 8,992,314 B2 | 3/2015 | Gatto | |
| 8,992,315 B2 | 3/2015 | Lundback | |
| 9,004,999 B2 | 4/2015 | Olive | |
| 9,005,025 B2 | 4/2015 | Joynes | |
| 9,011,232 B2 | 4/2015 | Kitamura | |
| 9,028,320 B2 | 5/2015 | Romano | |
| 9,033,806 B2 | 5/2015 | Bruzzese | |
| 9,039,516 B2 | 5/2015 | Parrott | |
| 9,039,527 B2 | 5/2015 | Bentley | |
| 9,058,714 B2 | 6/2015 | Hamlin | |
| 9,076,286 B2 | 7/2015 | Kitamura | |
| 2003/0225659 A1* | 12/2003 | Breeden | G06Q 40/00 705/36 R |
| 2006/0085325 A1* | 4/2006 | Jammal et al. | 705/38 |
| 2007/0087822 A1* | 4/2007 | Van Luchene | 463/25 |
| 2008/0027880 A1* | 1/2008 | Yu | A63F 13/10 705/36 R |
| 2009/0233718 A1* | 9/2009 | Shelton | A63H 18/16 463/42 |
| 2011/0238566 A1* | 9/2011 | Santos | 705/38 |

OTHER PUBLICATIONS

Sapere Aude Records SmartWhois, http://smartwhois.com/whois/sapere-aude.info, May 6, 2013, pp. 1-2, Matthias Abold, Willy-Schreier-Str. 21. Idstein 65510, DE.

Simarch—Home, http://www.simarch.com/Global.Site/, May 6, 2013, pp. 1-2, Simarch NV, Bedrijvencentrum Leuven N.V., Interleuvenlaan 62, Zone 2, 3001 Leuven (Heverlee), Belgium.

Simarch—Contact Us, http://www.simarch.com/Global.Site/FlashContent.aspx?ItemID=30&T=1, May 6, 2013, p. 1, Simarch NV, Bedrijvencentrum Leuven N.V., Interleuvenlaan 62, Zone 2, 3001 Leuven (Heverlee), Belgium.

Welcome AgBankSim, http://agbanksim.org/, May 6, 2013, p. 1, WhoisGuard Protected, WhoisGuard, 11400 W. Olympic Blvd. Suite 200, Los Angeles CA 90064, US.

About the Game AgBankSim, http://agbanksim.org/about, May 6, 2013, p. 1, WhoisGuard Protected, WhoisGuard, 11400 W. Olympic Blvd. Suite 200, Los Angeles CA 90064, US.

AgBankSim Records SmartWhois, http://smartwhois.com/whois/agbanksim.org, May 6, 2013, pp. 1-2, WhoisGuard Protected, WhoisGuard, 11400 W. Olympic Blvd. Suite 200, Los Angeles CA 90064, US.

Welcome to Sprout Software, http://www.sproutsoft.com/, May 6, 2013, p. 1, Sprout Software LLC, 324 E 11th Street, Suite 1603, Kansas City, MO 64106, US.

BBA Simulations, http://www.bbacademy.be/banksim.php, May 6, 2013, p. 1, Belgian Bankers Academy, Rue de Ligne 1, 1000 Brussels.

BBA Organisation, http://www.bbacademy.be/organisation.php, May 6, 2013, p. 1, Belgian Bankers Academy, Rue de Ligne 1, 1000 Brussels.

Banker's Academy Programs, http://www.bankersacademy.com/curr.php, May 6, 2013, p. 1, Banker's Academy, 501 Office Center Dr—Suite 100, Fort Washington, PA, 19034, US.

Banker's Academy Contact Us, http://www.bankersacademy.com/contact-us, May 6, 2013, p. 1, Banker's Academy, 501 Office Center Dr—Suite 100, Fort Washington, PA, 19034, US.

* cited by examiner

Figure 2: Game Structure

Figure 3: Module 1 flow chart

Figure 4: Module 2 flow chart

Figure 5: Module 3 Flow Chart

Figure 6: Module 4 Flow Chart

Screen 1: Mission Statement

In the "Mission Statement" screen, players are given instructions for their 'mission' in the upcoming module.

100

Screen 2: Underwriting

In the "Underwriting" screen, players input decisions which determine the size and risk of their portfolio. The variables which they must input vary by module, depending on the learning objective of the module.

Variables players enter may include:

- judgment credit policy such as time at residence, time at employment and how to verify loan documents (call, site visit, etc.).
- the percent of overrides to their credit policy which will be tolerated
- the interest rate to be charged on the loans
- the size of the loans as a ratio of borrower monthly income
  - Credit (Application) Score
  - Credit Bureau Score

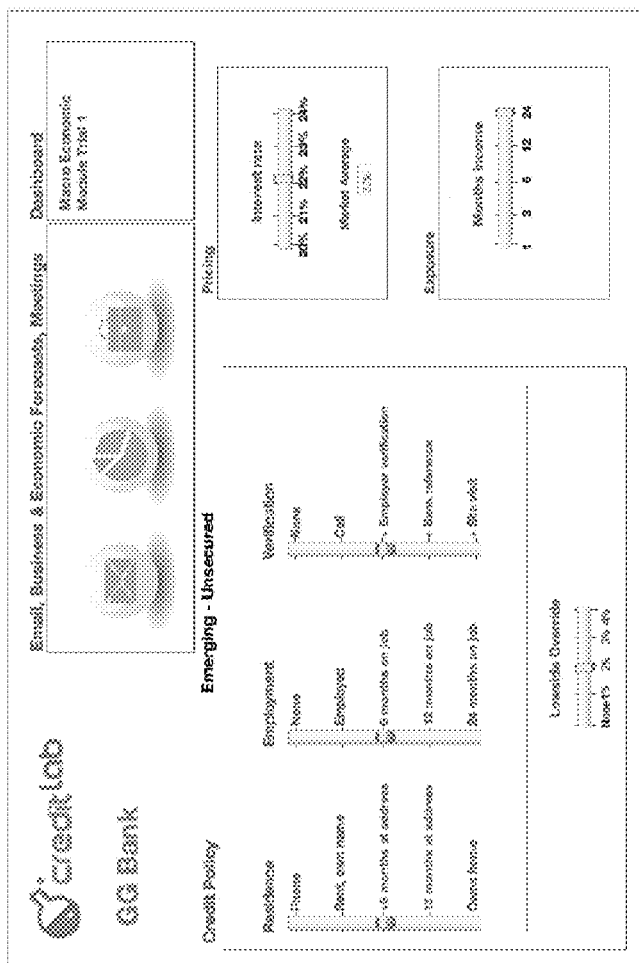

Screen 3: Results

In the "Results" screen, players interrogate graphically displayed financial results.

Graphs provided vary by the module and its learning objective that may include (among others)

- credit loss percent
- number of collectors required vs. in use
- delinquency percent
- Return on assets
- Number of accounts
- Net Income

100

Screen 4: Results

In the "Results" screen, data is populated from Quarter 1 to Quarter 8 as the player advances in the run.

This screen shot illustrates results which are displayed to the player at the end of Quarter 8. After exploring this graphical data, the player can start their next trial, which begins again at Quarter 1. They change their strategy in the subsequent trial based on what they've concluded from examining the results.

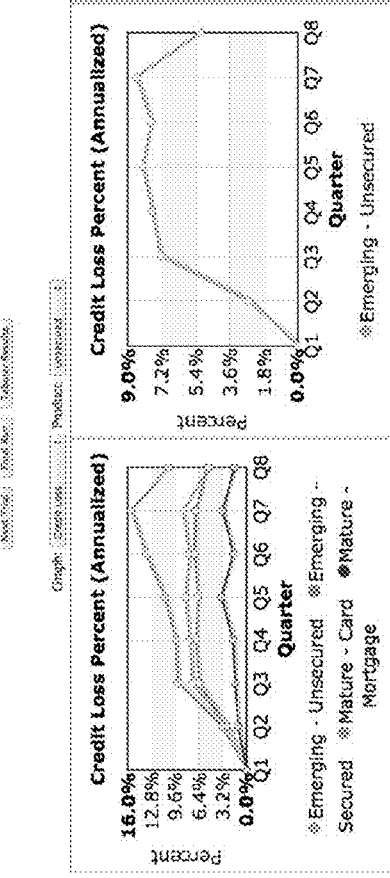

FIG. 10

Screen 5: Economic Forecast

In module 4, the "Economic Forecast" Screen is used. Players use three trials to stress test their portfolios under three different economic scenarios.

In this screen, players drag and drop the curves on the graphs in order to input their economic forecast to be used during the 8 quarters of the trial run.

“EDUCATION THROUGH EMPLOYMENT OF GAMING”

DESCRIPTION OF THE DRAWINGS

Features of exemplary implementations of the invention will become apparent from the description, the claims, and the accompanying drawings.

FIG. 8 is a representation of another screenshot of an implementation of the apparatus of FIG. 1.

FIG. 10 is a representation of a further screenshot of an implementation of the apparatus of FIG. 1.

DETAILED DESCRIPTION

Figure 1:
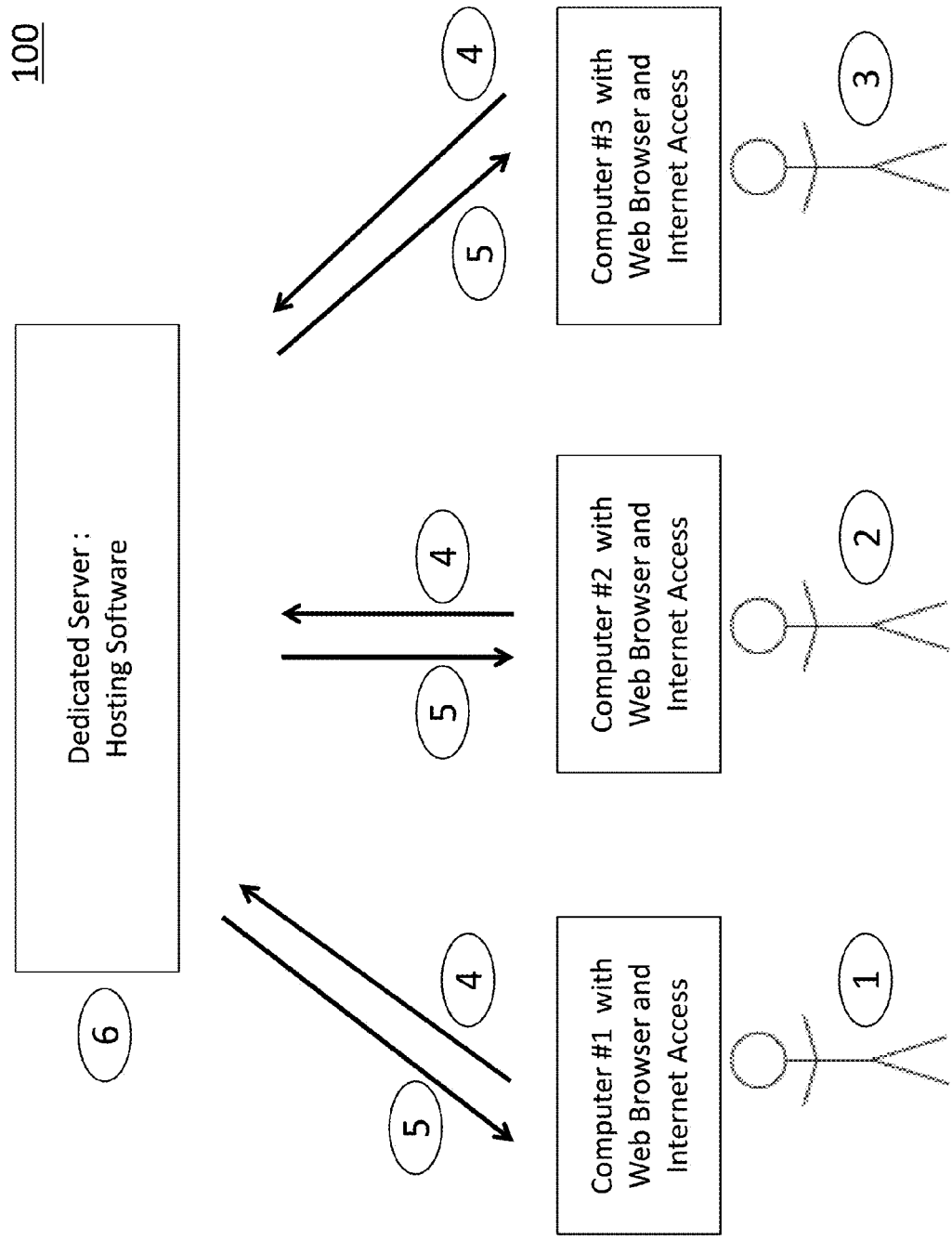
FIG. 1 is a representation of architecture of an implementation of an apparatus with learners as players who play either as individuals or in a team.

An implementation of an apparatus comprises an interactive education system. An implementation of an apparatus employs simulation gaming techniques. An implementation of an apparatus serves to teach credit risk strategies and/or decisioning, for example, to one or more learners. A learner in an example comprises one or more of a human, a woman, a man, an adult, an elderly person, a child, a player, a trainee, an intern, a student, a graduate, a user, and/or a financial services professional.

An implementation of an apparatus comprises a single-player or multiplayer educational online game. An implementation of an apparatus presents a computer generated game play world. Acquiring and/or demonstrating mastery and/or competency of target skills in an implementation of an apparatus comprise a condition and/or qualification for the learner to advance and/or perform desirable portfolio profitability. Target skills in an example comprise identified, pre-identified, selected, and/or preselected attributes, qualities, abilities, proficiencies, competencies, and/or faculties for development of one or more strategies and/or decisionings for successful, profitable, and/or effective credit risk management.

The game in an example of an implementation of an apparatus comprises an approach that promotes effectiveness in teaching one or more target skills, for example, a set of target educational skills, for example, in credit risk management strategy and/or decision making. An approach in an example motivates the learner to increase understanding of the target skills. An approach in an example requests the learner to demonstrate the target skills, for example, as part of an interactive simulation game.

An approach helps the learner to understand the target skills. One or more game scenarios in an example promote immediate meaning and/or relevance of the target skills to the learner within the game scenarios. An implementation of an apparatus allows direct and/or indirect feedback to the learner, for example, on understanding of the target skills. Feedback to the learner in an example comprises one or more of game performance, written learning materials, and/or personalized one-on-one coaching. Feedback to the learner in an example serves to motivate, increase, and/or promote understanding by the learner of one or more target skills.

An implementation of an apparatus comprises a calculation engine that is employable for interactive simulation gaming. The calculation engine in an example simulates one or more lending portfolios. The calculation engine in an example employs interactive simulation gaming to create an active learning environment for a learner.

An implementation of an apparatus comprises a calculation engine with interactive simulation gaming. The calculation engine in an example simulates multiple retail lending portfolios in a retail bank over a period of time, for example, over the course of two years for each run or iteration. The interactive simulation gaming in an example creates an active learning environment for the learner, for example, with one or more instructions and/or feedback.

An approach in an example employs a learning design principle of carefully determining an appropriate amount of complexity. An approach in an example transmits, effects, accomplishes, and/or causes formal learning objectives as a result of game play. Each module, for example, of a set of modules in an implementation of an apparatus, is linked to a specific learning outcome.

A software architecture of an implementation of an apparatus allows and/or promotes relative ease for addition one or more training modules, for example, to cover, instruct, and/or teach additional and/or further learning concepts. An implementation of an apparatus allows addition of one or more training modules to be performed by the learner, an instructor, a technician, an assistant, a guide, a counselor, a service provider, and/or a lender.

An approach in an example provides variables for the learner to choose from for input to an implementation of an apparatus in game play. The variables input by the learner for game play in an example are on real-life market conditions.

The calculation engine in an example simulates one or more behaviors of lending portfolios. The calculation engine in an example simulates one or more behaviors of retail lending portfolios, for example, based on one or more input decisions of one or more learners. An approach in an example allows and/or requests a learner to first decide, select, and/or choose a strategy. An approach in an example allows and/or requests a learner to decide, select, and/or choose one or more parameters for a strategy, for example, for credit policy and/or loan approval.

The calculation engine in an example employs the parameters chosen by the learner, for example, to perform a calculation. The calculation engine in an example employs the parameters chosen by the learner, for example, to calculate a financial outcome of the parameters chosen by the learner, for example, reflecting choices, selections, and/or decisions by the learner. The calculation engine in an example employs the parameters chosen by the learner to calculate a financial outcome over a period of time, for example, an initial six months.

An approach in an example links credit policy parameters to a resulting bad rate, or loan default rate. The calculation engine in an example employs a loan exposure amount to calculate an income for good loans and/or a loss rate for bad loans. The calculation engine in an example employs loan pricing to calculate a portfolio volume, for example, based on one or more industry estimates, for example, of borrower price sensitivity.

An implementation of an apparatus shows and/or displays to the learner results from the parameters chosen by the learner. After a learner inputs decisions in an example the decisions are sent to the calculation engine. The calculation engine in an example employs the decisions to calculate results and return the results to the "results" screen. The results in an example are posted to the learner's computer browser screen.

The results in an example comprise interactive graphs and tables for the learner. The learner in an example selects a data series as the results to be posted to the browser window by selecting the data series from a selection menu or other manner of selection. An approach in an example interactively shows results to the learner for examination, for example, once the calculation engine has employed one or more parameters input by the learner to create portfolio data, for example over an initial period of time, for example, a first six months.

An approach in an example allows and/or requests the learner to input one or more portfolio management decisions. A portfolio management decision in an example comprises how the learner wishes to manage one or more delinquent account collections. An implementation of an apparatus links one or more choices, selections, and/or decisions by the learner to results, for example, calculated by the calculation engine. The calculation engine in an example employs one or more inputs by the learner to calculate resulting default rates of one or more loans and/or one or more customer attrition rates. The calculation engine in an example bases one or more calculations on industry estimates.

An approach in an example allows and/or requests the learner to continue to examine interactive data results and to input decisions until an end of a period of time, for example, two years of operating the portfolios.

Turning to FIG. 1, in an implementation of an apparatus 100, items 1, 2, and 3 in an example represent learners as players who play either as individuals or in a team. Each player in an example can access the game via any computer web browser with internet access. The player in an example can employ any computing device with web browser with internet access. The player in an example logs into the software with id and password.

At 4, after logging into the software, players in an example are presented with the game scenario information. Next, the players in an example enter the players' decisions for managing the players' bank portfolio. At 6, the players' decisions in an example are sent to a dedicated server where the software is installed.

At 5, the software on the dedicated server (6) in an example computes one or more results and posts the one or more results to the players' computer browser screen. The player in an example interacts (4, 5) with a calculation engine as the player progresses through the game, entering more decisions and receiving more results.

Figure 2:
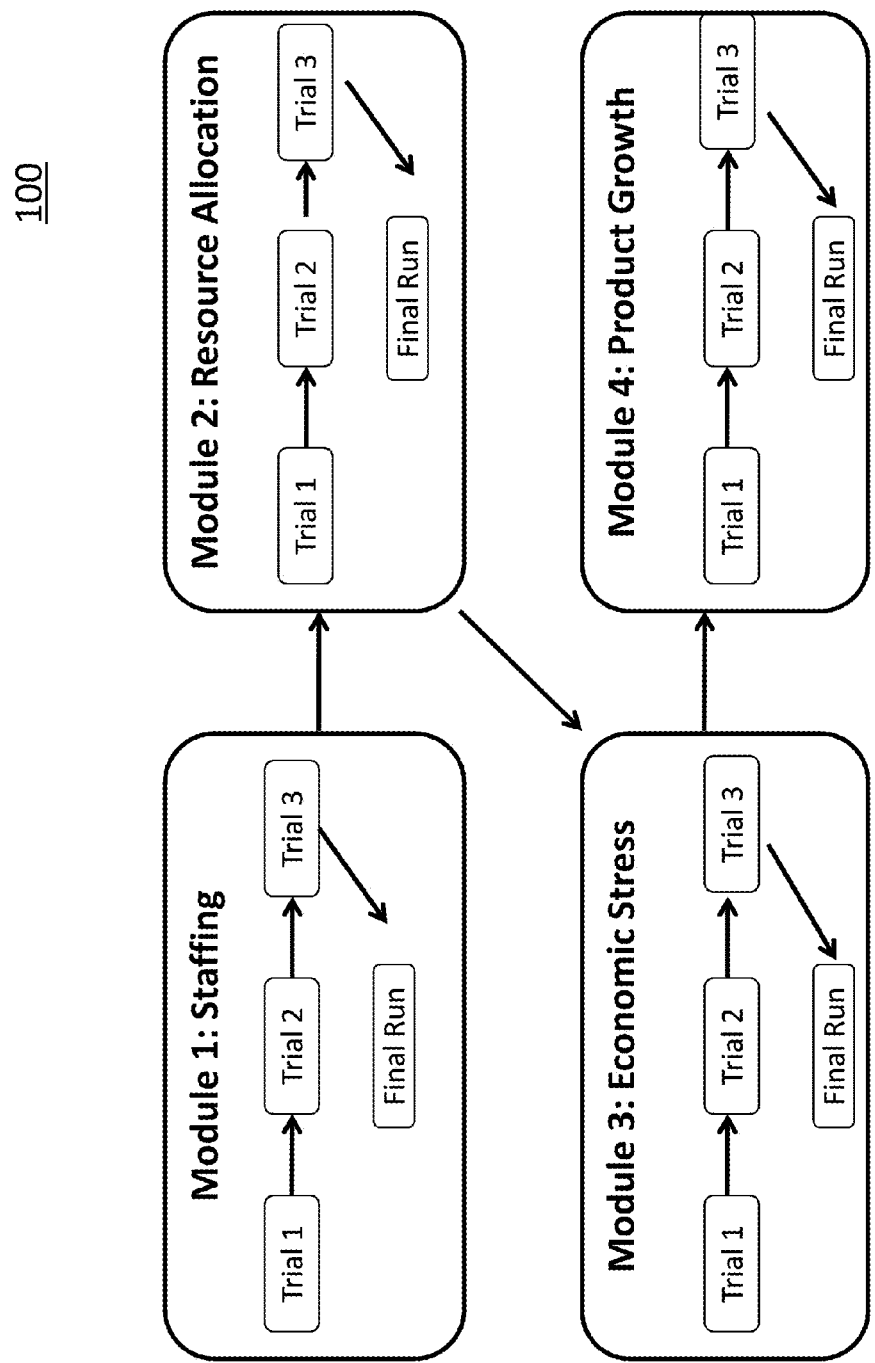
FIG. 2 is a representation of a game structure of an implementation of the apparatus of FIG. 1.

Turning to FIG. 2, in an implementation of an apparatus in each module in an example players repeat the two year process four times: a) three trials or practice runs, and b) one final run. In an example of the final run, the players' results are used to determine which team has won that module of the game. The team with the highest net income in the final run in an example wins that module.

Figure 3:
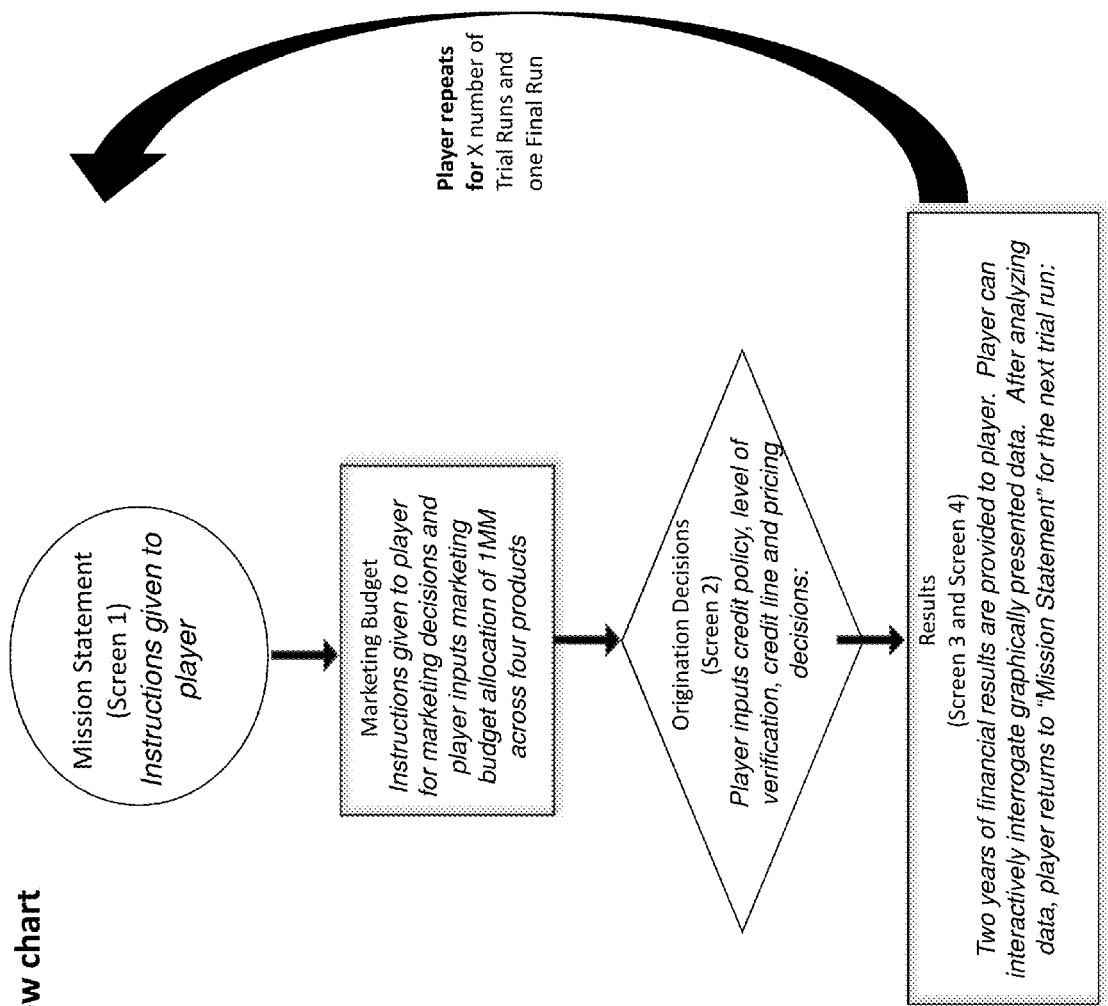
FIG. 3 is a representation of a logic flow of an implementation of the apparatus of FIG. 1.

Turning to FIG. 3, in an implementation of an apparatus, in a Mission Statement in an example a player enters the player's bank name and/or watches a video and/or reads instructions that provide context or setting of a scene for game play.

In Marketing Budget in an example players watch Briefing video and/or read "briefing emails" that comprise background information and/or instructions for actions by the players. Players in an example have one million US Dollars that must be allocated across four portfolios. If the marketing budget is larger in an example then more customers apply for the product and the size of the portfolio is larger. If the portfolio is profitable in an example then the final net income is larger due to larger portfolio size.

In Origination Decisions in an implementation of an apparatus players enter their Credit Risk approval strategy that in an example determines the size and risk level of the portfolios in the player's bank. For credit policy, players in an example are given a relatively small set of variables that determine the player's strategy. For example, if the player chooses a relatively low application score cutoff, then more customers are approved and the default rate is higher, but the portfolio is larger and produces more interest income. The same calculation in an example is applied to other credit policy variables that in an example can be chosen in ranges that are relatively conservative (e.g., smaller portfolio, fewer defaults) or aggressive (e.g., larger portfolio with more income, more defaults). Players in an example can also choose how aggressively the players would like to verify the application data provided by the applicant. If they choose to verify a larger percent of the information, in an example the cost to the player will be higher, fewer customers will apply, but the default rate will be lower.

In module 1 in an implementation of an apparatus the learning objectives in an example comprise understanding of market and use of underwriting standards.

An approach in an example heightens, highlights, emphasizes, and/or stresses importance of market understanding. An approach in an example creates an audience of interested credit applicants though marketing. Well-spent marketing dollars, budgets, and/or funds in an example result in a relatively good portfolio, for example, in terms of revenue and/or risk.

With respect to use of underwriting standards, an approach in an example employs an underwriting decision as a combination of use of credit policy, credit scores, underwriting standards, verification standards, and/or the like. An approach in an example considers how to use a plurality of these tools together, for example, based on an envisioned strategy.

Figure 4:
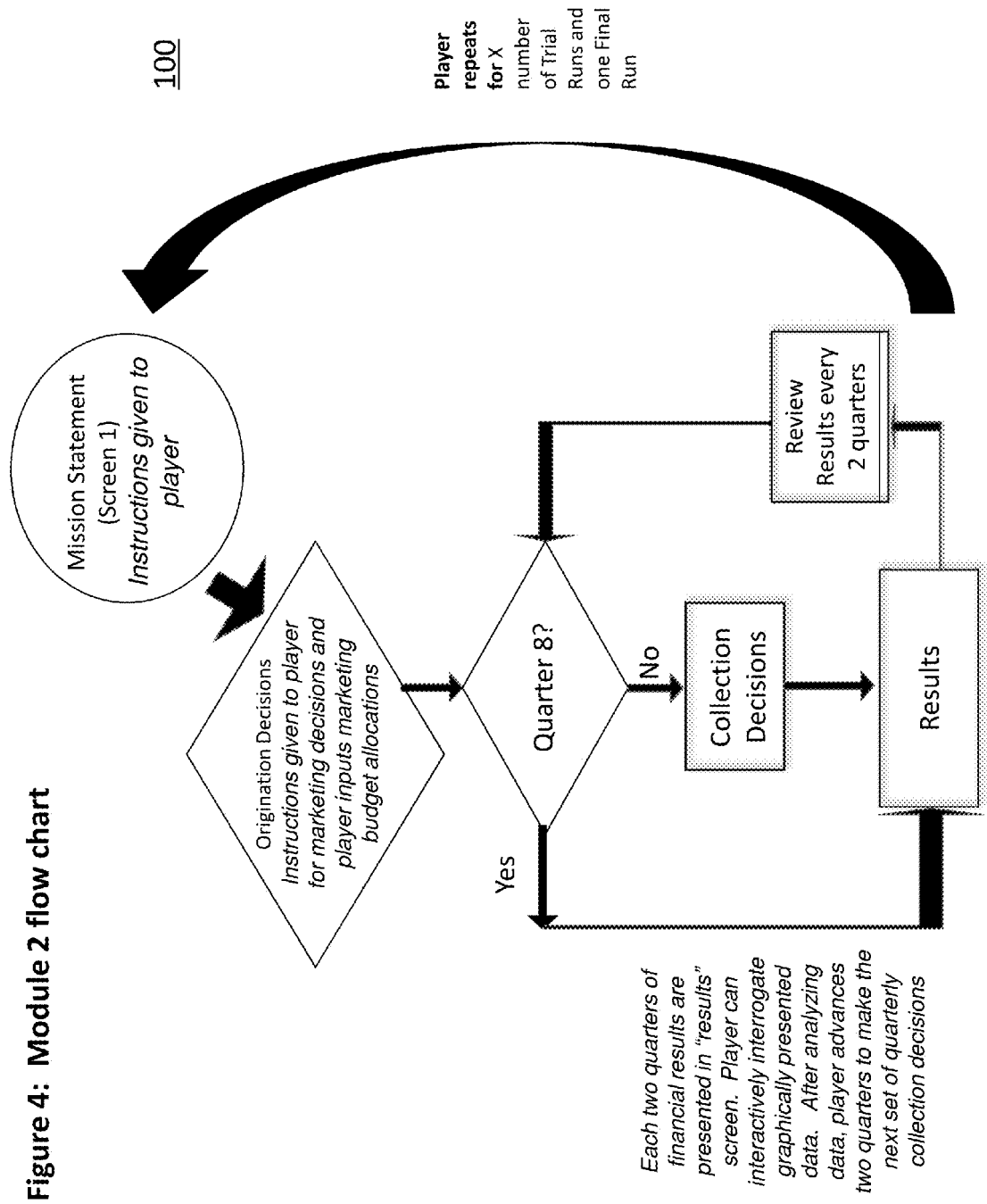
FIG. 4 is a representation of another logic flow of an implementation of the apparatus of FIG. 1.

Turning to FIG. 4, in an implementation of an apparatus in module 2 in an example a player has X number of Trial Runs and one Final Run. A Run in an example comprises eight quarters (two years) of time. In a Mission Statement in an example a player enters the player's bank name and/or watches a video and/or reads instructions that provide "scene setting". In Marketing Budget in an example a player watches "Briefing" video and/or reads "briefing emails" that comprise background information and/or instructions for the player's actions. In Origination Decisions in an example players enter the Credit Risk approval strategy that in an example determines the size and/or risk level of the portfolios in the players' bank(s). In Collection Decisions in an example players decide the players' Policy Actions for the players' delinquent loan collection process. In Results in an example players view the financial results at the Entire Portfolio level, individual portfolio level, and By Run.

In module 2 in an example players make the same decisions as in module 1. Players in an example also decide the credit line or size of the loan. Players in an example additionally manage the players' delinquent loan collection strategy.

If the players choose a relatively low credit line in an example then income is lower but the loss resulting from defaults is lower. When managing collections in an example players can choose relatively aggressive strategies, such as taking legal action against borrowers that in an example result in fewer defaults, but higher cost, and some customers closing the corresponding customers' accounts due to dissatisfaction with the lender. Players in an example may choose a more lenient collections strategy such as taking no action or only sending an SMS text message, that in an example results in lower collection cost but higher losses due to increased loan delinquency rates.

In module 2 in an example the formal learning objectives comprise underwriting and exposure. With respect to underwriting in an example an approach asks the players to integrate new information about market maturity such as the bureau score maturing. Also an approach in an example asks the players to learn how to use both an application score and bureau score together.

With respect to exposure, an approach in an example asks the players to recognize that part of underwriting decision is exposure. An approach in an example asks the players to learn that larger exposure leads to higher interest revenue but may result in high losses. Also an approach in an example asks the players to learn to strike the right balance between the risk of a high loss due to high exposure and the reward of high revenue from a high exposure.

Figure 5:
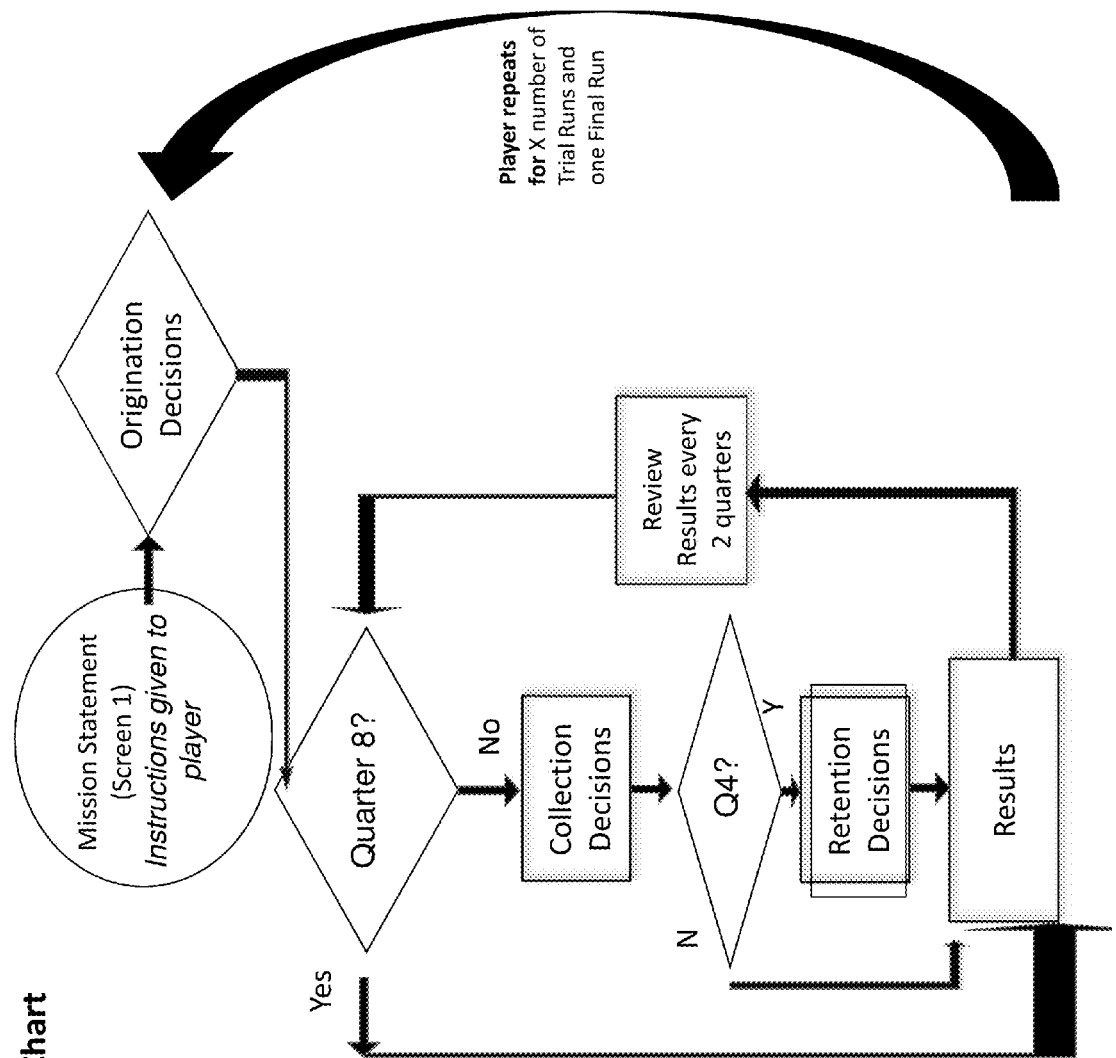
FIG. 5 is a representation of yet another logic flow of an implementation of the apparatus of FIG. 1.

Turning to FIG. 5, in an implementation of an apparatus in module 3 in an example a player has X number of Trial Runs and one Final Run. A Run in an example comprises eight quarters (two years) of time. In a Mission Statement in an example a player enters the player's bank name and/or watches a video and/or reads instructions that provide "scene setting". In Marketing Budget in an example players watch "Briefing" video and/or read "briefing emails" that comprise background information and/or instructions for the players' actions. In Origination Decisions in an example players enter the players' Credit Risk approval strategy that in an example determine a size and/or risk level of one or more portfolios in the players' bank(s). In Collection Decisions in an example players decide the players' Policy Actions for the players' delinquent loan collection process. In Results in an example players view one or more financial results at an Entire Portfolio level, individual portfolio level, and/or By Run.

In module 3 in an example players make the same decisions as in modules 1 and 2, but also decide loan pricing. In an underwriting screen in an example players decide an interest rate to be charged on a loan. A higher interest rate in an example results in fewer interested customers, a smaller portfolio, and higher income per account. A lower interest rate in an example results in more customers interested in the product, a larger portfolio, but lower income per account due to smaller interest margins.

In module 3 in an example the formal learning objectives comprise pricing and collection strategies. With respect to pricing in an example relatively high pricing may cause attrition but has larger and/or bigger margins. Relatively low pricing in an example may retain customers but results in relatively small and/or thin margins. An approach in an example has players observe this tradeoff in the results and strike a right, targeted, and/or desirable balance.

With respect to collections strategies in an example relatively soft, weak, and/or passive collections in an example result in increased and/or higher delinquency. An approach in an example has too relatively strong collections score and/or count as relatively costly and/or ineffective. An approach in an example asks the players to learn to strike the right balance between the high cost of strong collections strategy and the resulting lower occurrence of delinquencies as compared to the low cost of passive collections and the resulting higher occurrence of delinquencies.

Figure 6:
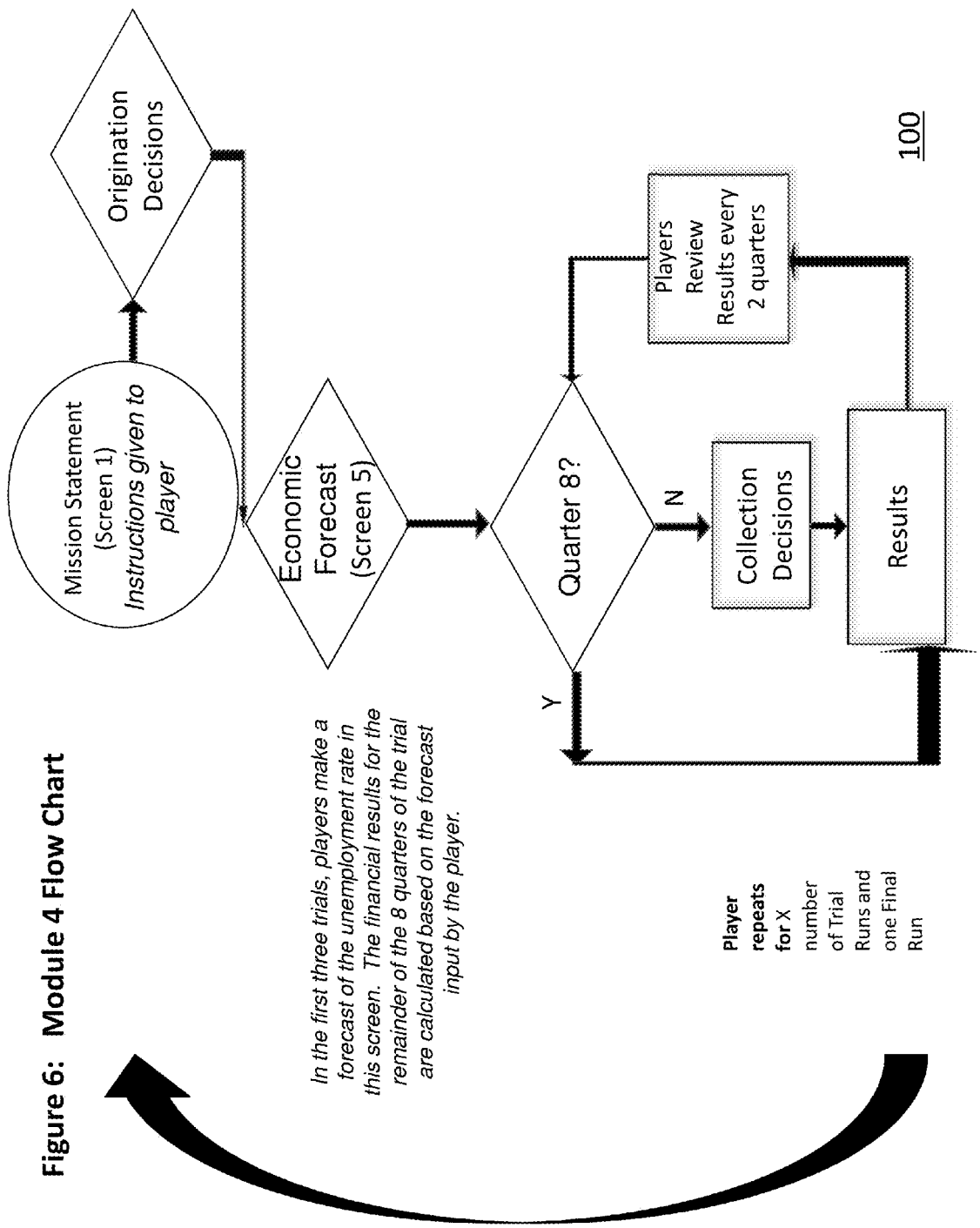
FIG. 6 is a representation of a further logic flow of an implementation of the apparatus of FIG. 1.
Figure 7:
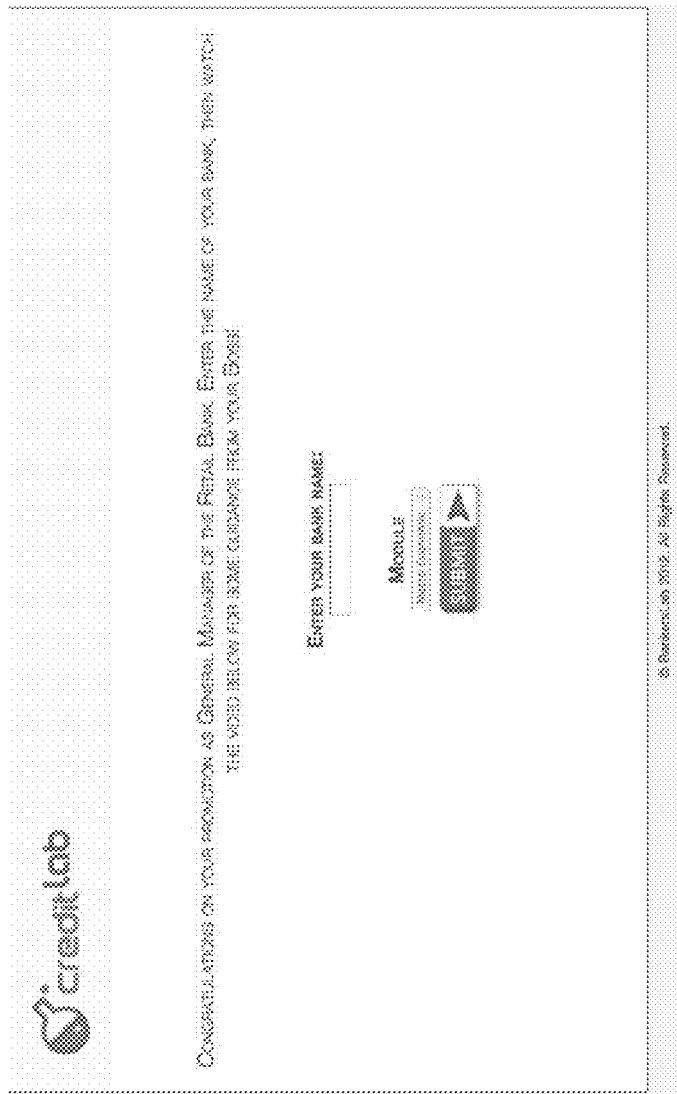
FIG. 7 is a representation of a screenshot of an implementation of the apparatus of FIG. 1.
Figure 9:
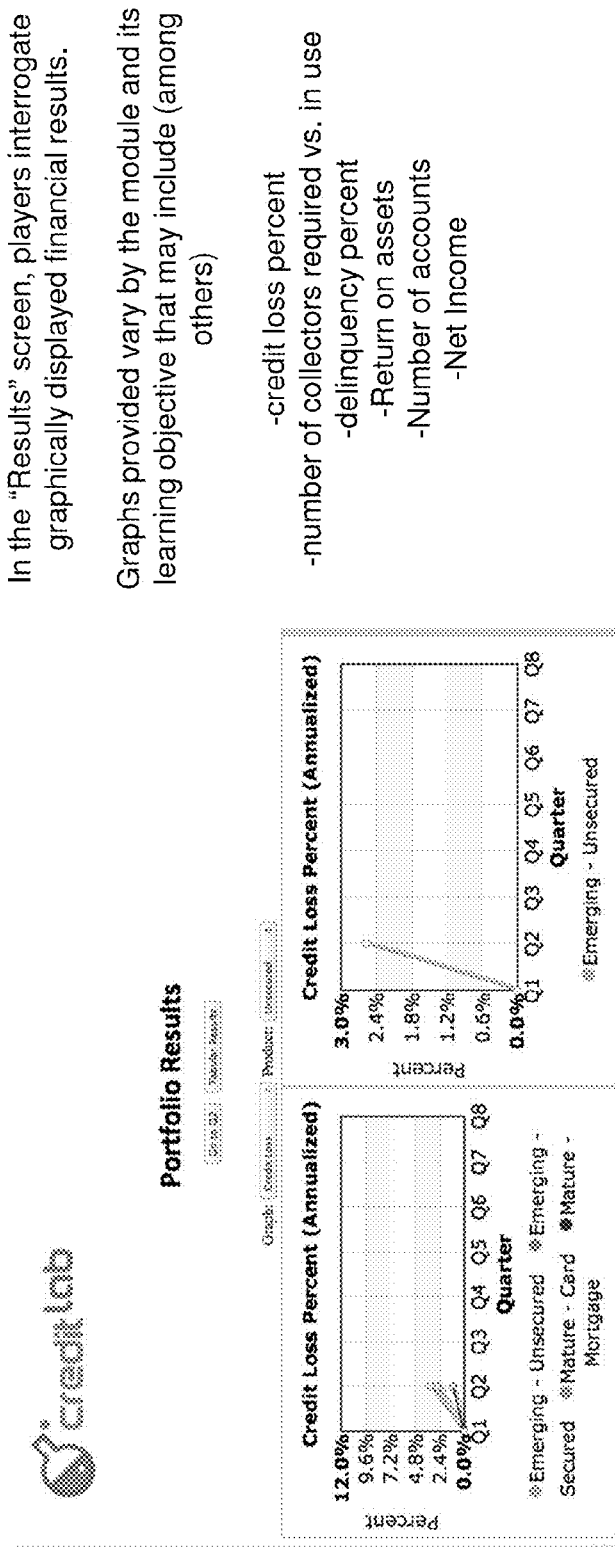
FIG. 9 is a representation of yet another screenshot of an implementation of the apparatus of FIG. 1.
Figure 11:
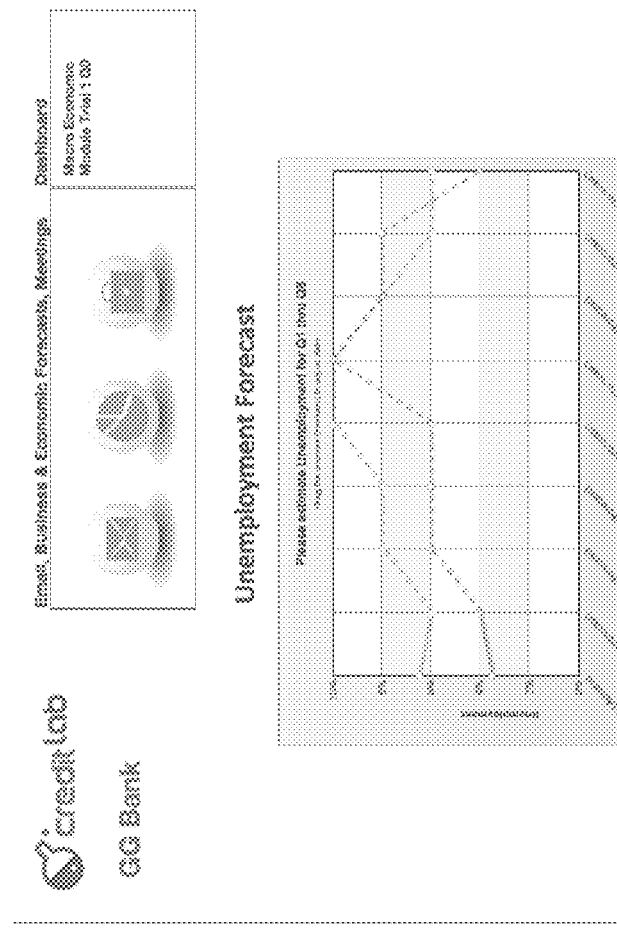
FIG. 11 is a representation of a still further screenshot of an implementation of the apparatus of FIG. 1.

Turning to FIG. 6, in an implementation of an apparatus in module 4 in an example a player has X number of Trial Runs and one Final Run. A Run in an example comprises eight quarters (two years) of time. In a Mission Statement in an example a player enters the player's bank name and/or watches a video and/or reads instructions that provide "scene setting". In Marketing Budget in an example players watch "Briefing" video and/or read "briefing emails" that comprise background information and/or instructions for the players' actions. In Origination Decisions in an example players enter the players' Credit Risk approval strategy that in an example determine a size and/or risk level of one or more portfolios in the players' bank(s). In Collection Decisions in an example players decide the players' Policy Actions for the players' delinquent loan collection process. In Economic Forecast in an example players make an economic forecast that allows the players to stress test the players' portfolios in a number of runs, for example, three trial runs, where in an example of a fourth and final run the game in an example generates conditions from an economic recession. In Results in an example players view one or more financial results at an Entire Portfolio level, individual portfolio level, and/or By Run.

In module 4 in an example players make the same decisions as in modules 1, 2, and 3 but in the final run the game in an example generates conditions of an economic recession. During the first three trials in an example players forecast an unemployment rate and make portfolio decisions in a context of corresponding economic conditions. If the unemployment rate is higher in an example then loan delinquency rates are higher. Players in an example also analyze data to correctly, desirably, and/or effectively forecast the number of collection staff needed in the future quarters. If the players under-staff the collection staff in an example then losses relatively increase and/or explode. If the players overstaff the collection staff in an example then the fixed cost are relatively high.

In module 4 in an implementation of an apparatus the learning objectives in an example comprise impact of macro economy on delinquency and planning ahead becoming even more significant in an economic downturn.

With respect to impact of macro economy on delinquency, an approach in an example asks players to observe the impact of a downturn on the vintage delinquency curve. With respect to planning ahead becoming even more significant and/or even more critical in an economic downturn, an approach in an example asks players to anticipate increase in delinquency and prepare an appropriate, desirable, efficient, and/or effective number of collection staff.

Examples of screenshots with accompanying description are presented in FIGS. 7-11.

An implementation of an apparatus comprises an algorithm, procedure, program, process, mechanism, engine, model, coordinator, module, application, software, code, and/or logic. An implementation of an apparatus comprises one or more user-level programs, for example, user interface logic residing in one or more user-level program files.

An implementation of an apparatus comprises a plurality of components such as one or more of electronic components, chemical components, organic components, mechanical components, hardware components, optical components, and/or computer software components. A number of such components may be combined or divided in an implementation of an apparatus. One or more components of an implementation of an apparatus and/or one or more parts thereof may comprise one or more of a computing, communication, interactive, and/or imaging device, interface, computer, and/or machine. One or more components of an implementation of an apparatus and/or one or more parts thereof may serve to allow selection, employment, channeling, processing, analysis, communication, and/or transformation of electrical signals and/or between and/or among physical, logical, transitional, transitory, persistent, and/or electrical signals, inputs, outputs, measurements, and/or representations.

A plurality of instances of a particular component may be present in an implementation of an apparatus. One or more features described herein in connection with one or more components and/or one or more parts thereof may be applicable and/or extendible analogously to one or more other instances of the particular component and/or other components in an implementation of an apparatus. One or more features described herein in connection with one or more components and/or one or more parts thereof may be omitted from or modified in one or more other instances of the particular component and/or other components in an implementation of an apparatus. An exemplary technical effect is one or more exemplary and/or desirable functions, approaches, and/or procedures. An exemplary component of an implementation of an apparatus may employ and/or comprise a set and/or series of computer instructions written in or implemented with any of a number of programming languages, as will be appreciated by those skilled in the art.

An implementation of an apparatus may comprise any (e.g., horizontal, oblique, angled, or vertical) orientation, with the description and figures herein illustrating an exemplary orientation of an implementation of an apparatus, for explanatory purposes. One or more components of an implementation of an apparatus and/or one or more parts thereof may occupy a number of locations of an implementation of an apparatus.

An implementation of an apparatus may encompass an article and/or an article of manufacture. The article may comprise one or more computer-readable signal-bearing media. The article may comprise means and/or instructions in the one or more media for one or more exemplary and/or desirable functions, approaches, and/or procedures.

An implementation of an apparatus may employ one or more computer-readable signal-bearing media. A computer-readable signal-bearing medium may store software, firmware and/or assembly language for performing one or more portions of an implementation of an apparatus. An example of a computer-readable signal bearing medium for an implementation of an apparatus may comprise a memory and/or recordable data storage medium. A computer-readable signal-bearing medium for an implementation of an apparatus in an example may comprise one or more of a magnetic, electrical, optical, biological, chemical, and/or atomic data storage medium. For example, an implementation of the computer-readable signal-bearing medium may comprise one or more flash drives, optical discs, memory cards, computer networks, CDs (compact discs), DVDs (digital video discs), hard drives, portable drives, and/or electronic memory. A computer-readable signal-bearing medium in an example may comprise a physical computer medium and/or computer-readable signal-bearing tangible medium.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus configured to facilitate interactive simulation gaming for creation of an active learning environment on credit risk management for a player, the apparatus comprising:

a processor;

a memory that comprises user interface logic; and a user interface system configured to receive input from the player and present information to the player on training-stylized non-live data decomposed into a plurality of training courses;

wherein the processor employs computer instructions in the memory to cause the processor to perform operations of a what-if training tool that communicates with the player through employment of the user interface logic and the user interface system and ensures achievement for the player of a plurality of individual learning goals on customer behavior in retail lending, that comprises a first learning goal on customer behavior in retail lending and a second learning goal on customer behavior in retail lending, through if-then interactive testing of the player through employment of the user interface logic and the user interface system, on the training-stylized non-live data decomposed into the plurality of training courses that comprises a first training course and a second training course, that teaches the player by communication with the player through employment of the user interface logic and the user interface system the first learning goal on customer behavior in retail lending through completion of the first training course at a first time interval in the what-if training tool and teaches the player by communication with the player through employment of the user interface logic and the user interface system the second learning goal on customer behavior in retail lending through completion of the second training course at a second time interval in the what-if training tool.

2. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a total marketing budget to be allocated across a plurality of training-stylized retail lending portfolios in a training-stylized retail bank;

wherein if, in the if-then interactive testing of the player through employment of the user interface logic and the user interface system in the any one of the first training course at the first time interval or the second training course at the second time interval, a portion of the marketing budget allocated to a corresponding one of the training-stylized retail lending portfolios in the training-stylized retail bank is chosen relatively larger by the player by employment of the user interface logic and the user interface system, then:

the what-if training tool by communication with the player through employment of the user interface logic and the user interface system, to promote achievement by the player of the corresponding one of the first learning goal on customer behavior in retail lending or the second learning goal on customer behavior in retail lending, simulates more customers apply for the corresponding one of the training-stylized retail lending portfolios in the training-stylized retail bank and an increased size for the corresponding one of the training-stylized retail lending portfolios in the training-stylized retail bank; and if the corresponding one of the training-stylized retail lending portfolios in the training-stylized retail bank is profitable, then the what-if training tool by communication with the player through employment of the user interface logic and the user interface system, to promote achievement by the player of the corresponding one of the first learning goal on customer behavior in retail lending or the second learning goal on customer behavior in retail lending, simulates an increased net income for the corresponding one of the training-stylized retail lending portfolios in the training-stylized retail bank from the increased size of the corresponding one of the training-stylized retail lending portfolios in the training-stylized retail bank.

3. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of one or more credit risk approval strategies for size and risk level of one or more training-stylized retail lending portfolios in a training-stylized retail bank over a period of time selectable by the player by employment of the user interface logic and the user interface system;

wherein if, in the if-then interactive testing of the player through employment of the user interface logic and the user interface system in the any one of the first training course at the first time interval or the second training course at the second time interval, the player by employment of the user interface logic and the user interface system chooses a relatively low application score cutoff, a relatively low credit bureau score cutoff, or a relatively less restrictive credit policy for a corresponding one of the training-stylized retail lending portfolios in the training-stylized retail bank, then the what-if training tool by communication with the player through employment of the user interface logic and the user interface system, for the corresponding one of the training-stylized retail lending portfolios in the training-stylized retail bank over the period of time selectable by the player by employment of the user interface logic and the user interface system, simulates:

relatively more customers approved;
relatively higher default rate;
relatively larger portfolio size; and
relatively more interest income, that promote achievement by the player of the corresponding one of the first learning goal on customer behavior in retail lending or the second learning goal on customer behavior in retail lending.

4. The apparatus of claim 1, wherein the processor employs computer instructions in the memory to cause the processor to perform operations of the what-if training tool to:

in the first training course at the first time interval corresponding to the first learning goal on customer behavior in retail lending as selected by the player through a first indication to the what-if training tool by employment of the user interface logic and the user interface system, present the player by communication with the player through employment of the user interface logic and the user interface system with a total marketing budget to be allocated across a plurality of training-stylized retail lending portfolios in a training-stylized retail bank;

wherein if, in the if-then interactive testing of the player through employment of the user interface logic and the user interface system in the first training course at the first time interval, a portion of the marketing budget allocated to a corresponding one of the training-stylized retail lending portfolios in the training-stylized retail bank is chosen relatively larger by the player by employment of the user interface logic and the user interface system, then:

the what-if training tool by communication with the player through employment of the user interface logic and the user interface system, to promote achievement by the player of the first learning goal on customer behavior in retail lending, simulates more customers apply for the corresponding one of the training-stylized retail lending portfolios in the training-stylized retail bank and an increased size for the corresponding one of the training-stylized retail lending portfolios in the training-stylized retail bank; and if the corresponding one of the training-stylized retail lending portfolios in the training-stylized retail bank is profitable, then the what-if training tool by communication with the player through employment of the user interface logic and the user interface system, to promote achievement by the player of the first learning goal on customer behavior in retail lending, simulates an increased net income for the corresponding one of the training-stylized retail lending portfolios in the training-stylized retail bank from the increased size of the corresponding one of the training-stylized retail lending portfolios in the training-stylized retail bank;

in the second training course at the second time interval corresponding to the second learning goal on customer behavior in retail lending as selected by the player through a second indication to the what-if training tool by employment of the user interface logic and the user interface system, present the player by communication with the player through employment of the user interface logic and the user interface system with a choice, in the if-then interactive testing of the player through employment of the user interface logic and the user interface system in the second training course at the second time interval, of one or more credit risk approval strategies for size and risk level of one or more training-stylized retail lending portfolios in a training-stylized retail bank over a period of time selectable by the player by employment of the user interface logic and the user interface system;

wherein if, in the if-then interactive testing of the player through employment of the user interface logic and the user interface system in the second training course at the second time interval, the player by employment of the user interface logic and the user interface system chooses a relatively low application score cutoff, a relatively low credit bureau score cutoff, or a relatively less restrictive credit policy for a corresponding one of the training-stylized retail lending portfolios in the training-stylized retail bank, then the what-if training tool by communication with the player through employment of the user interface logic and the user interface system, for the corresponding one of the training-stylized retail lending portfolios in the training-stylized retail bank over the period of time selectable by the player by employment of the user interface logic and the user interface system, simulates:

relatively more customers approved;
relatively higher default rate;
relatively larger portfolio size; and
relatively more interest income,
that promote achievement by the player of the second learning goal on customer behavior in retail lending.

5. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of one or more credit risk approval strategies for size and risk level of one or more training-stylized retail lending portfolios in a training-stylized retail bank over a period of time selectable by the player by employment of the user interface logic and the user interface system;

wherein if, in the if-then interactive testing of the player through employment of the user interface logic and the user interface system in the any one of the first training course at the first time interval or the second training course at the second time interval, the player by employment of the user interface logic and the user interface system chooses a relatively smaller size for a first corresponding one of the training-stylized retail lending portfolios in the training-stylized retail bank, then the what-if training tool by communication with the player through employment of the user interface logic and the user interface system, for the first corresponding one of the training-stylized retail lending portfolios in the training-stylized retail bank, simulates relatively lower default rate, over the period of time selectable by the player by employment of the user interface logic and the user interface system, that promotes achievement by the player of the corresponding one of the first learning goal on customer behavior in retail lending or the second learning goal on customer behavior in retail lending;

wherein if, in the if-then interactive testing of the player through employment of the user interface logic and the user interface system in the any one of the first training course at the first time interval or the second training course at the second time interval, the player by employment of the user interface logic and the user interface system chooses a relatively larger size for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates relatively higher default rate, over the period of time selectable by the player by employment of the user interface logic and the user interface system, that promotes achievement by the player of the corresponding one of the first learning goal on customer behavior in retail lending or the second learning goal on customer behavior in retail lending;

wherein if, in the if-then interactive testing of the player through employment of the user interface logic and the user interface system in the any one of the first training course at the first time interval or the second training course at the second time interval, the player by employment of the user interface logic and the user interface system chooses a relatively larger percent of customer application data for verification in a third corresponding one of the training-stylized retail lending portfolios in the training-stylized retail bank, then the what-if training tool by communication with the player through employment of the user interface logic and the user interface system, for the third corresponding one of the training-stylized retail lending portfolios in the training-stylized retail bank simulates, over the period of time selectable by the player by employment of the user interface logic and the user interface system:

relatively higher cost to the training-stylized retail bank;
relatively fewer customers; and
relatively lower default rate,
that promote achievement by the player of the corresponding one of the first learning goal on customer behavior in retail lending or the second learning goal on customer behavior in retail lending.

6. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of one or more management decisions that comprise how the player wishes to manage one or more delinquent account collections for one or more training-stylized retail lending portfolios in a training-stylized retail bank over a period of time selectable by the player by employment of the user interface logic and the user interface system;

wherein, in the if-then interactive testing of the player through employment of the user interface logic and the user interface system in the any one of the first training course at the first time interval or the second training course at the second time interval, the what-if training tool employs the one or more management decisions from the player by employment of the user interface logic and the user interface system to calculate resulting default rates of one or more training-stylized loans and/or one or more customer attrition rates of the one or more training-stylized retail lending portfolios in the training-stylized retail bank over the period of time selectable by the player by employment of the user interface logic and the user interface system that promote achievement by the player of the corresponding one of the first learning goal on customer behavior in retail lending or the second learning goal on customer behavior in retail lending.

7. The apparatus of claim 6, wherein until an end of the period of time selectable by the player by employment of the user interface logic and the user interface system in a corresponding run in the any one of the first training course at the first time interval or the second training course at the second time interval, the what-if training tool by communication with the player through employment of the user interface logic and the user interface system in the if-then interactive testing of the player through employment of the user interface logic and the user interface system, to promote achievement by the player of the corresponding one of the first learning goal on customer behavior in retail lending or the second learning goal on customer behavior in retail lending, allows and/or requests the player by employment of the user interface logic and the user interface system to:
examine interactive data results; and
input portfolio decisions as the one or more management decisions;
wherein the interactive data results comprise the resulting default rates of one or more training-stylized loans and/or the one or more customer attrition rates of the one or more training-stylized retail lending portfolios in the training-stylized retail bank over the period of time selectable by the player by employment of the user interface logic and the user interface system.

8. The apparatus of claim 6, wherein if the player chooses by employment of the user interface logic and the user interface system, in response to the choice in the if-then interactive testing of the player through employment of the user interface logic and the user interface system in the any one of the first training course at the first time interval or the second training course at the second time interval, a relatively lower credit line, a relatively lower loan amount, or a relatively lower loan exposure for a first corresponding one of the training-stylized retail lending portfolios in the training-stylized retail bank, then the what-if training tool by communication with the player through employment of the user interface logic and the user interface system, for the first corresponding one of the training-stylized retail lending portfolios in the training-stylized retail bank, simulates:
relatively lower income; and
relatively lower default rate,
that promote achievement by the player of the corresponding one of the first learning goal on customer behavior in retail lending or the second learning goal on customer behavior in retail lending;
wherein if the player chooses by employment of the user interface logic and the user interface system, in response to the choice in the if-then interactive testing of the player through employment of the user interface logic and the user interface system in the any one of the first training course at the first time interval or the second training course at the second time interval, a relatively aggressive collection strategy for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates:
relatively lower default rate;
relatively higher cost to the training-stylized retail bank; and
some loss of customers who close accounts from dissatisfaction with the training-stylized retail bank,
that promote achievement by the player of the corresponding one of the first learning goal on customer behavior in retail lending or the second learning goal on customer behavior in retail lending;
wherein if the player chooses by employment of the user interface logic and the user interface system, in response to the choice in the if-then interactive testing of the player through employment of the user interface logic and the user interface system in the any one of the first training course at the first time interval or the second training course at the second time interval, a relatively lenient collection strategy for a third corresponding one of the training-stylized retail lending portfolios in the training-stylized retail bank, then the what-if training tool by communication with the player through employment of the user interface logic and the user interface system, for the third corresponding one of the training-stylized retail lending portfolios in the training-stylized retail bank, simulates:
relatively lower collection cost to the training-stylized retail bank; and
relatively higher loss from increased loan delinquency rate,
that promote achievement by the player of the corresponding one of the first learning goal on customer behavior in retail lending or the second learning goal on customer behavior in retail lending.

9. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of an interest rate to be charged on a loan;
wherein if, in the if-then interactive testing of the player through employment of the user interface logic and the user interface system in the any one of the first training course at the first time interval or the second training course at the second time interval, the player by employment of the user interface logic and the user interface system chooses a relatively higher interest rate to be charged on a loan for a first corresponding one of a plurality of training-stylized retail lending portfolios in a training-stylized retail bank, then the what-if training tool by communication with the player through employment of the user interface logic and the user interface system, for the first corresponding one of the training-stylized retail lending portfolios in the training-stylized retail bank, simulates:
relatively fewer interested customers;
relatively decreased size; and
relatively higher income,
that promote achievement by the player of the corresponding one of the first learning goal on customer behavior in retail lending or the second learning goal on customer behavior in retail lending;
wherein if, in the if-then interactive testing of the player through employment of the user interface logic and the user interface system in the any one of the first training course at the first time interval or the second training course at the second time interval, the player by employment of the user interface logic and the user interface system chooses a relatively lower interest rate to be charged on a loan for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates:
relatively more interested customers;
relatively increased size; and
relatively lower income,
that promote achievement by the player of the corresponding one of the first learning goal on customer behavior in retail lending or the second learning goal on customer behavior in retail lending.

10. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of an economic forecast that the what-if training tool employs to simulate for the player by communication with the player through employment of the user interface logic and the user interface system, portfolio stress testing of a plurality of training-stylized retail lending portfolios in a training-stylized retail bank over a period of time selectable by the player by employment of the user interface logic and the user interface system;
wherein if, in the if-then interactive testing of the player through employment of the user interface logic and the user interface system in the any one of the first training course at the first time interval or the second training course at the second time interval, the player by employment of the user interface logic and the user interface system underestimates an unemployment rate as an economic condition context for a first corresponding one of a plurality of training-stylized retail lending portfolios in a training-stylized retail bank, then the what-if training tool by communication with the player through employment of the user interface logic and the user interface system, for the first corresponding one of the training-stylized retail lending portfolios in the training-stylized retail bank, simulates a relatively higher loan delinquency rate, over the period of time selectable by the player by employment of the user interface logic and the user interface system, that promotes achievement by the player of the corresponding one of the first learning goal on customer behavior in retail lending or the second learning goal on customer behavior in retail lending;
wherein if, in the if-then interactive testing of the player through employment of the user interface logic and the user interface system in the any one of the first training course at the first time interval or the second training course at the second time interval, the player by employment of the user interface logic and the user interface system underestimates a need for collection staff in an economic condition context for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates relatively higher losses, over the period of time selectable by the player by employment of the user interface logic and the user interface system, that promotes achievement by the player of the corresponding one of the first learning goal on customer behavior in retail lending or the second learning goal on customer behavior in retail lending; and
wherein if, in the if-then interactive testing of the player through employment of the user interface logic and the user interface system in the any one of the first training course at the first time interval or the second training course at the second time interval, the player by employment of the user interface logic and the user interface system overestimates a need for collection staff in an economic condition context for a third corresponding one of the training-stylized retail lending portfolios in the training-stylized retail bank, then the what-if training tool by communication with the player through employment of the user interface logic and the user interface system, for the third corresponding one of the training-stylized retail lending portfolios in the training-stylized retail bank, simulates relatively higher fixed costs, over the period of time selectable by the player by employment of the user interface logic and the user interface system, that promotes achievement by the player of the corresponding one of the first learning goal on customer behavior in retail lending or the second learning goal on customer behavior in retail lending.

11. The apparatus of claim 1, wherein the processor employs computer instructions in the memory to cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, allow and/or request the player by communication with the player through employment of the user interface logic and the user interface system, in the if-then interactive testing of the player through employment of the user interface logic and the user interface system in the any one of the first training course at the first time interval or the second training course at the second time interval and until an end of a period of time selectable by the player by employment of the user interface logic and the user interface system in a corresponding run in the any one of the first training course at the first time interval or the second training course at the second time interval, to:

examine by employment of the user interface logic and the user interface system a training-stylized financial outcome as interactive data results of one or more training-stylized retail lending portfolios in a training-stylized retail bank over the period of time selectable by the player by employment of the user interface logic and the user interface system; and input by employment of the user interface logic and the user interface system one or more parameters as one or more management decisions for a corresponding one or more of the one or more training-stylized retail lending portfolios in the training-stylized retail bank over the period of time selectable by the player by employment of the user interface logic and the user interface system, thereby promoting achievement by the player of the corresponding one of the first learning goal on customer behavior in retail lending or the second learning goal on customer behavior in retail lending.

12. A method for facilitating interactive simulation gaming for creation of an active learning environment on credit risk management for a player, the method comprising the steps of:

employing computer instructions in a memory to cause a processor to perform operations of a what-if training tool that communicates with the player through employment of user interface logic in the memory and a user interface system configured to receive input from the player and present information to the player on training-stylized non-live data decomposed into a plurality of training courses and accesses the non-live data decomposed into the plurality of training courses that comprises a first training course and a second training course;

employing computer instructions in the memory to cause the processor to perform operations of the what-if training tool to if-then interactively test the player through employment of the user interface logic and the user interface system on the first training course, through employment of a first portion of the non-live data stylized to a first subset of cause-and-effect relationships in retail lending identified as training priority therefor, to ensure achievement by the player of a first learning goal on customer behavior in retail lending through completion of the first training course at a first time interval; and employing computer instructions in the memory to cause the processor to perform operations of the what-if training tool to if-then interactively test the player through employment of the user interface logic and the user interface system on the second training course, through employment of a second portion of the non-live data stylized to a second subset of cause-and-effect relationships in retail lending identified as training priority therefor, to ensure achievement by the player of a second learning goal on customer behavior in retail lending, accumulated with achievement by the player of the first learning goal on customer behavior in retail lending through completion of the first training course at the first time interval, through completion of the second training course at a second time interval.

13. The method of claim 12, wherein the step of employing computer instructions in the memory to cause the processor to perform operations of the what-if training tool to if-then interactively test the player through employment of the user interface logic and the user interface system on the first training course, through employment of the first portion of the non-live data stylized to the first subset of cause-and-effect relationships in retail lending identified as training priority therefor, to ensure achievement by the player of the first learning goal on customer behavior in retail lending through completion of the first training course at the first time interval, comprises the step of:

employing computer instructions in the memory to cause the processor to perform operations of the what-if training tool to communicate with the player through employment of the user interface logic and the user interface system to present the player with a total marketing budget to be allocated across a plurality of training-stylized retail lending portfolios in a training-stylized retail bank;

wherein if a portion of the marketing budget allocated to a corresponding one of the training-stylized retail lending portfolios in the training-stylized retail bank is chosen relatively larger by the player through employment of the user interface logic and the user interface system, then the what-if training tool by communication with the player through employment of the user interface logic and the user interface system, to promote achievement by the player of the first learning goal on customer behavior in retail lending, simulates more customers apply for the corresponding one of the training-stylized retail lending portfolios in the training-stylized retail bank and an increased size for the corresponding one of the training-stylized retail lending portfolios in the training-stylized retail bank; and if the corresponding one of the training-stylized retail lending portfolios in the training-stylized retail bank is profitable, then the what-if training tool by communication with the player through employment of the user interface logic and the user interface system, to promote achievement by the player of the first learning goal on customer behavior in retail lending, simulates an increased net income for the corresponding one of the training-stylized retail lending portfolios in the training-stylized retail bank from the increased size of the corresponding one of the training-stylized retail lending portfolios in the training-stylized retail bank.

14. The method of claim 12, wherein the step of employing computer instructions in the memory to cause the processor to perform operations of the what-if training tool to if-then interactively test the player through employment of the user interface logic and the user interface system on the second training course, through employment of the second portion of the non-live data stylized to the second subset of cause-and-effect relationships in retail lending identified as training priority therefor, to ensure achievement by the player of the second learning goal on customer behavior in retail lending, accumulated with achievement by the player of the first learning goal on customer behavior in retail lending through completion of the first training course at the first time interval, through completion of the second training course at the second time interval, comprises the step of:

employing computer instructions in the memory to cause the processor to perform operations of the what-if training tool to communicate with the player through employment of the user interface logic and the user interface system to present the player with a choice of one or more credit risk approval strategies for size and risk level of one or more training-stylized retail lending portfolios in a training-stylized retail bank over a period of time selectable by the player by employment of the user interface logic and the user interface system;

wherein if the player by employment of the user interface logic and the user interface system chooses a relatively low application score cutoff, a relatively low credit bureau score cutoff, or a relatively less restrictive credit policy for a corresponding one of the training-stylized retail lending portfolios in the training-stylized retail bank, then the what-if training tool by communication with the player through employment of the user interface logic and the user interface system, for the corresponding one of the training-stylized retail lending portfolios in the training-stylized retail bank over the period of time selectable by the player by employment of the user interface logic and the user interface system, simulates:

relatively more customers approved;
relatively higher default rate;
relatively larger portfolio size; and
relatively more interest income,
that promote achievement by the player of the second learning goal on customer behavior in retail lending.

15. The method of claim 12, wherein the step of employing computer instructions in the memory to cause the processor to perform operations of the what-if training tool to if-then interactively test the player through employment of the user interface logic and the user interface system on the first training course, through employment of the first portion of the non-live data stylized to the first subset of cause-and-effect relationships in retail lending identified as training priority therefor, to ensure achievement by the player of the first learning goal on customer behavior in retail lending through completion of the first training course at the first time interval, comprises the step of:

employing computer instructions in the memory to cause the processor to perform operations of the what-if training tool to communicate with the player through employment of the user interface logic and the user interface system to present the player with a choice of one or more credit risk approval strategies for size and risk level of one or more training-stylized retail lending portfolios in a training-stylized retail bank over a period of time selectable by the player by employment of the user interface logic and the user interface system;

wherein if the player by employment of the user interface logic and the user interface system chooses a relatively smaller size for a first corresponding one of the training-stylized retail lending portfolios in the training-stylized retail bank, then the what-if training tool by communication with the player through employment of the user interface logic and the user interface system, for the first corresponding one of the training-stylized retail lending portfolios in the training-stylized retail bank, simulates relatively lower default rate, over the period of time selectable by the player by employment of the user interface logic and the user interface system, that promotes achievement by the player of the first learning goal on customer behavior in retail lending through completion of the first training course at the first time interval;

wherein if the player by employment of the user interface logic and the user interface system chooses a relatively larger size for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates relatively higher default rate, over the period of time selectable by the player by employment of the user interface logic and the user interface system, that promotes achievement by the player of the first learning goal on customer behavior in retail lending through completion of the first training course at the first time interval;

wherein if the player by employment of the user interface logic and the user interface system chooses a relatively larger percent of customer application data for verification in a third corresponding one of the training-stylized retail lending portfolios in the training-stylized retail bank, then the what-if training tool by communication with the player through employment of the user interface logic and the user interface system, for the third corresponding one of the training-stylized retail lending portfolios in the training-stylized retail bank simulates, over the period of time selectable by the player by employment of the user interface logic and the user interface system:

relatively higher cost to the training-stylized retail bank;
relatively fewer customers; and
relatively lower default rate,
that promote achievement by the player of the first learning goal on customer behavior in retail lending through completion of the first training course at the first time interval.

16. The method of claim 12, wherein the step of employing computer instructions in the memory to cause the processor to perform operations of the what-if training tool to if-then interactively test the player through employment of the user interface logic and the user interface system on the first training course, through employment of the first portion of the non-live data stylized to the first subset of cause-and-effect relationships in retail lending identified as training priority therefor, to ensure achievement by the player of the first learning goal on customer behavior in retail lending through completion of the first training course at the first time interval, comprises the step of:

employing computer instructions in the memory to cause the processor to perform operations of the what-if training tool to communicate with the player through employment of the user interface logic and the user interface system to present the player with a choice of one or more management decisions that comprise how the player wishes to manage one or more delinquent account collections for one or more training-stylized retail lending portfolios in a training-stylized retail bank over a period of time selectable by the player by employment of the user interface logic and the user interface system;

wherein the what-if training tool employs the one or more management decisions from the player by employment of the user interface logic and the user interface system to calculate resulting default rates of one or more training-stylized loans and/or one or more customer attrition rates of the one or more training-stylized retail lending portfolios in the training-stylized retail bank over the period of time selectable by the player by employment of the user interface logic and the user interface system that promote achievement by the player of the first learning goal on customer behavior in retail lending through completion of the first training course at the first time interval.

17. An article for facilitating interactive simulation gaming for creation of an active learning environment on credit risk management for a player, the article comprising:
a non-transitory computer-readable tangible medium including computer instructions that, when executed by a processor, cause the processor to perform operations of a what-if training tool that communicates with the player through employment of user interface logic in the non-transitory computer-readable tangible medium and a user interface system configured to receive input from the player and present information to the player on training-stylized non-live data decomposed into a plurality of training courses and ensures achievement for the player of a plurality of individual learning goals on customer behavior in retail lending, that comprises a first learning goal on customer behavior in retail lending and a second learning goal on customer behavior in retail lending, through if-then interactive testing of the player through employment of the user interface logic and the user interface system, on the training-stylized non-live data decomposed into the plurality of training courses that comprises a first training course and a second training course, that teaches the player by communication with the player through employment of the user interface logic and the user interface system the first learning goal on customer behavior in retail lending through completion of the first training course at a first time interval in the what-if training tool and teaches the player by communication with the player through employment of the user interface logic and the user interface system the second learning goal on customer behavior in retail lending through completion of the second training course at a second time interval in the what-if training tool.

18. The article of claim 17, wherein the non-transitory computer-readable tangible medium includes computer instructions that, when executed by the processor, cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a total marketing budget to be allocated across a plurality of training-stylized retail lending portfolios in a training-stylized retail bank;
wherein if, in the if-then interactive testing of the player through employment of the user interface logic and the user interface system in the any one of the first training course at the first time interval or the second training course at the second time interval, a portion of the marketing budget allocated to a corresponding one of the training-stylized retail lending portfolios in the training-stylized retail bank is chosen relatively larger by the player by employment of the user interface logic and the user interface system, then:
the what-if training tool by communication with the player through employment of the user interface logic and the user interface system, to promote achievement by the player of the corresponding one of the first learning goal on customer behavior in retail lending or the second learning goal on customer behavior in retail lending, simulates more customers apply for the corresponding one of the training-stylized retail lending portfolios in the training-stylized retail bank and an increased size for the corresponding one of the training-stylized retail lending portfolios in the training-stylized retail bank; and
if the corresponding one of the training-stylized retail lending portfolios in the training-stylized retail bank is profitable, then the what-if training tool by communication with the player through employment of the user interface logic and the user interface system, to promote achievement by the player of the corresponding one of the first learning goal on customer behavior in retail lending or the second learning goal on customer behavior in retail lending, simulates an increased net income for the corresponding one of the training-stylized retail lending portfolios in the training-stylized retail bank from the increased size of the corresponding one of the training-stylized retail lending portfolios in the training-stylized retail bank.

19. The article of claim 17, wherein the non-transitory computer-readable tangible medium includes computer instructions that, when executed by the processor, cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of one or more credit risk approval strategies for size and risk level of one or more training-stylized retail lending portfolios in a training-stylized retail bank over a period of time selectable by the player by employment of the user interface logic and the user interface system;
wherein if, in the if-then interactive testing of the player through employment of the user interface logic and the user interface system in the any one of the first training course at the first time interval or the second training course at the second time interval, the player by employment of the user interface logic and the user interface system chooses a relatively low application score cutoff, a relatively low credit bureau score cutoff, or a relatively less restrictive credit policy for a corresponding one of the training-stylized retail lending portfolios in the training-stylized retail bank, then the what-if training tool by communication with the player through employment of the user interface logic and the user interface system, for the corresponding one of the training-stylized retail lending portfolios in the training-stylized retail bank over the period of time selectable by the player by employment of the user interface logic and the user interface system, simulates:
relatively more customers approved;
relatively higher default rate;
relatively larger portfolio size; and
relatively more interest income,
that promote achievement by the player of the corresponding one of the first learning goal on customer behavior in retail lending or the second learning goal on customer behavior in retail lending.

20. The article of claim 17, wherein the non-transitory computer-readable tangible medium includes computer instructions that, when executed by the processor, cause the processor to perform operations of the what-if training tool to, in any one of the first training course at the first time interval or the second training course at the second time interval corresponding to one of the first learning goal on customer behavior in retail lending and the second learning goal on customer behavior in retail lending as selected by the player through an indication to the what-if training tool by employment of the user interface logic and the user interface system, present the player by communication with the player through employment of the user interface logic and the user interface system with a choice, in the if-then interactive testing of the player through employment of the user interface logic and the user interface system in the any one of the first training course at the first time interval or the second training course at the second time interval, of one or more credit risk approval strategies for size and risk level of one or more training-stylized retail lending portfolios in a training-stylized retail bank over a period of time selectable by the player by employment of the user interface logic and the user interface system;
wherein if, in the if-then interactive testing of the player through employment of the user interface logic and the user interface system in the any one of the first training course at the first time interval or the second training course at the second time interval, the player by employment of the user interface logic and the user interface system chooses a relatively smaller size for a first corresponding one of the training-stylized retail lending portfolios in the training-stylized retail bank, then the what-if training tool by communication with the player through employment of the user interface logic and the user interface system, for the first corresponding one of the training-stylized retail lending portfolios in the training-stylized retail bank, simulates relatively lower default rate, over the period of time selectable by the player by employment of the user interface logic and the user interface system, that promotes achievement by the player of the corresponding one of the first learning goal on customer behavior in retail lending or the second learning goal on customer behavior in retail lending;
wherein if, in the if-then interactive testing of the player through employment of the user interface logic and the user interface system in the any one of the first training course at the first time interval or the second training course at the second time interval, the player by employment of the user interface logic and the user interface system chooses a relatively larger size for a second corresponding one of the training-stylized retail lending portfolios in the training-stylized retail bank, then the what-if training tool by communication with the player through employment of the user interface logic and the user interface system, for the second corresponding one of the training-stylized retail lending portfolios in the training-stylized retail bank, simulates relatively higher default rate, over the period of time selectable by the player by employment of the user interface logic and the user interface system, that promotes achievement by the player of the corresponding one of the first learning goal on customer behavior in retail lending or the second learning goal on customer behavior in retail lending;
wherein if, in the if-then interactive testing of the player through employment of the user interface logic and the user interface system in the any one of the first training course at the first time interval or the second training course at the second time interval, the player by employment of the user interface logic and the user interface system chooses a relatively larger percent of customer application data for verification in a third corresponding one of the training-stylized retail lending portfolios in the training-stylized retail bank, then the what-if training tool by communication with the player through employment of the user interface logic and the user interface system, for the third corresponding one of the training-stylized retail lending portfolios in the training-stylized retail bank simulates, over the period of time selectable by the player by employment of the user interface logic and the user interface system:
relatively higher cost to the training-stylized retail bank;
relatively fewer customers; and
relatively lower default rate,
that promote achievement by the player of the corresponding one of the first learning goal on customer behavior in retail lending or the second learning goal on customer behavior in retail lending.

* * * * *